United States Patent [19]

Yokozuka et al.

[11] Patent Number: 5,328,007
[45] Date of Patent: Jul. 12, 1994

[54] REVERSE ROTATION PREVENTING DEVICE

[75] Inventors: Takashi Yokozuka; Yoshikazu Takahashi, both of Kiryu; Masao Yoshida, Gunma, all of Japan

[73] Assignee: Mitsuba Electric Manufacturing Co., Ltd., Gunma, Japan

[21] Appl. No.: 988,753

[22] Filed: Dec. 10, 1992

[30] Foreign Application Priority Data

Dec. 17, 1991 [JP] Japan ............... 3-110552[U]

[51] Int. Cl.5 .............................. F16D 51/04
[52] U.S. Cl. ................... 192/8 C; 188/77 W; 188/82.6
[58] Field of Search ............ 192/8 C, 41 S, 81 C; 188/77 W, 82.6, 134

[56] References Cited

U.S. PATENT DOCUMENTS

| | | | |
|---|---|---|---|
| 2,571,232 | 10/1951 | Gorske | 192/41 S |
| 3,135,369 | 6/1964 | Nisenson et al. | 192/8 C |
| 3,757,472 | 9/1973 | Rogakos. | |
| 4,257,497 | 3/1981 | Schroeder | 188/77 W |
| 4,372,432 | 2/1983 | Waine et al. | 192/8 C |
| 4,465,171 | 8/1984 | Koyama | 192/81 C |
| 4,646,888 | 3/1987 | Higuchi et al. | 192/8 C |

FOREIGN PATENT DOCUMENTS 60-245841 12/1985 Japan.
128942 8/1950 Sweden ............... 192/41 S Primary Examiner—Richard M. Lorence

[57] ABSTRACT

A reverse rotation preventing device comprising: a fixed ring disposed in proximity to the external peripheral surface of a coil spring; an input coupling rotatably driven; an output coupling, to which is fixed an output shaft; and a reinforcing ring on the input side and a reinforcing ring on the output side, which cover the opposite ends of the coil spring, respectively. Engaging pawls are projected and bent in the axial direction at the both ends of the coil spring, respectively, and an engaging recession for engaging the engaging pawl is formed on each of both reinforcing rings. An engageable portion of the input coupling is engaged with an engageable pawl formed on the reinforcing ring on the input side to decrease the diameter of the coil spring, so that the output shaft is rotated. An engageable portion of the output coupling is engaged with an engageable pawl formed on the reinforcing ring on the output side to increase the diameter of the coil spring, so that the output shaft is prevented from rotating reversely.

12 Claims, 6 Drawing Sheets

REVERSE ROTATION PREVENTING DEVICE

BACKGROUND OF THE INVENTION

1. Field of the Invention

This invention relates to a reverse rotation preventing device, and more particularly to a technique of preventing the reverse rotation transmitted from the driven side to the driving side, effectively utilized, for example, in a power window mechanism for opening or closing a window in a vehicle by means of a motor.

2. Related Art Statement

As a reverse rotation preventing device for preventing opening a window from the side of a window glass in a power window mechanism, there are known ones described in Japanese Patent Application Laid-Open No. 60-245841 and U.S. Pat. No. 3757472.

With these reverse rotation preventing devices, when the driving force from a motor acts on a rotating body on the input side, an engageable portion provided on the rotating body is engaged with an engageable pawl of a coil spring to decrease the diameter of the coil spring, whereby the coil spring is released from contact with a ring member, so that the driving force from the motor is transmitted to a rotating body on the output side through the rotating body on the input side, thereby driving a window opening-closing mechanism.

On the contrary, when an improper force from the window opening-closing mechanism acts on the rotating body on the output side, an engageable portion of the rotating body is engaged with an engaging pawl of the coil spring to increase the diameter of the coil spring, whereby the coil spring is pressed against the ring member, so that a rotary shaft of the motor is prevented from rotating due to the improper force from the power window mechanism.

Further, in these reverse rotation preventing devices, the coil spring is covered with reinforcing rings on opposite sides of the coil spring in the axial direction to prevent the engaging pawl of the coil spring from being deformed when a considerable force acts on the engaging pawl.

However, in these conventional reverse rotation preventing devices as described above, the engaging pawl of the coil spring is bent to project in the diametral direction toward the center of the coil spring, whereby, when the bending accuracy of the engaging pawl of the coil spring is low, sometimes, there may be cases where the diameter decreasing action and diameter enlarging action of the coil spring becomes improper.

SUMMARY OF THE INVENTION

An object of the present invention is to provide a reverse rotation preventing device capable of reliably preventing a coil spring from being deformed improperly.

A reverse rotation preventing device according to the present invention, comprising:

a coil spring formed with engaging pawls, respectively, at a starting end of winding and a terminating end of winding of said coil spring; a fixed ring arranged coaxially with the coil spring disposed in proximity to the external peripheral surface of the coil spring on the outside of the coil spring; an input coupling arranged coaxially with the coil spring and rotatable by a driving force from a driving source; an output coupling arranged coaxially with the coil spring, supported rotatably and having an output shaft fixed thereto; a reinforcing ring on the input side arranged to cover one end face in axial direction of the coil spring; a reinforcing ring on the output side arranged to cover the other end face in axial direction of the coil spring; an engageable pawl to be engaged with an engageable portion of the input coupling, expandingly formed on internal periphery of the reinforcing ring on the input side; and an engageable pawl to be engaged with an engageable portion of the output coupling, expandingly formed on internal periphery of the reinforcing ring on the output side;

wherein both engaging pawls of said coil spring are respectively bent in the axial direction of said coil spring;

said reinforcing ring on the input side is openedly provided therein with an engaging recession for engaging one of the engaging pawls of said coil spring, so as to operate the coil spring in the direction of decreasing the diameter; and said reinforcing ring on the output side is openedly provided therein with an engaging recession for engaging the other of the engaging pawls of said coil spring, so as to operate the coil spring in the direction of increasing the diameter.

In the reverse rotation preventing device according to the present invention as described above, the engaging pawls of the coil spring are bent in the axial direction of the coil spring, and the end faces of the coil spring in the axial direction thereof are covered with the reinforcing rings respectively, whereby, when the force from the input coupling side or from the output coupling side acts on each of the engaging pawls of the coil spring through each of the reinforcing rings, the force acts on the engaging ring in the perpendicular direction thereto, with the result that the coil spring can be prevented from being deformed improperly.

DETAILED DESCRIPTION OF THE PREFERRED EMBODIMENTS

Figure 6:
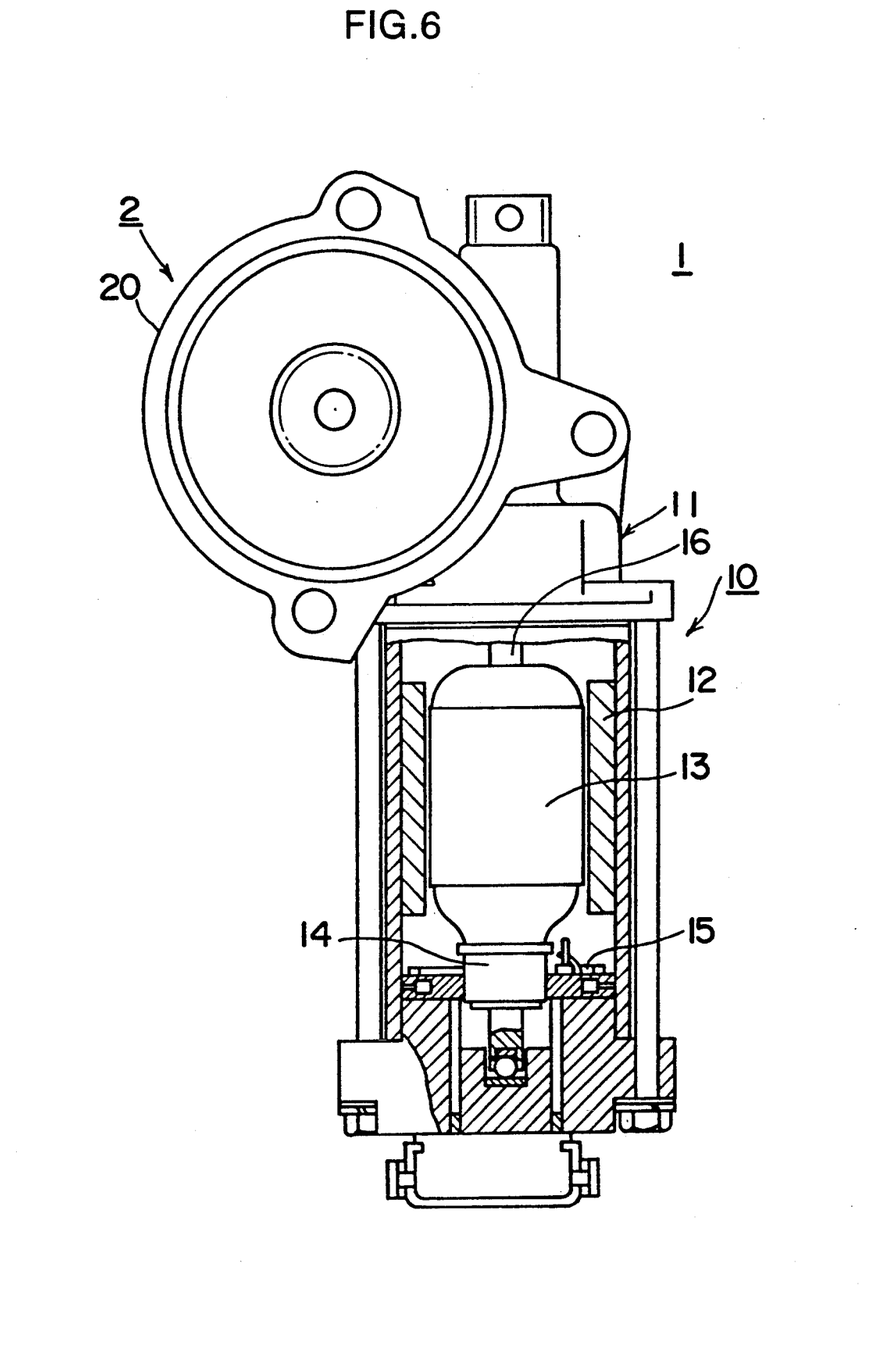
FIG. 6 is a partially omitted sectional view showing a power window mechanism using the reverse rotation preventing device.

In this embodiment, as shown in FIG. 6, a reverse rotation preventing device 2 according to the present invention is used in a power window mechanism 1 for opening or closing a window of a vehicle or the like by means of a turning force of a motor. This power window mechanism 1 is provided with a motor 10, and a housing 20 of the reverse rotation preventing device 2 is provided integrally with a housing 11 of this motor in series thereto. The motor housing 11 houses therein a magnet 12 as being a stator, an armature 13 as being a rotator, a commutator 14 and a brush derlee 15. An output shaft 16 of the motor 10 is provided integrally with a worm 17.

Figure 2:
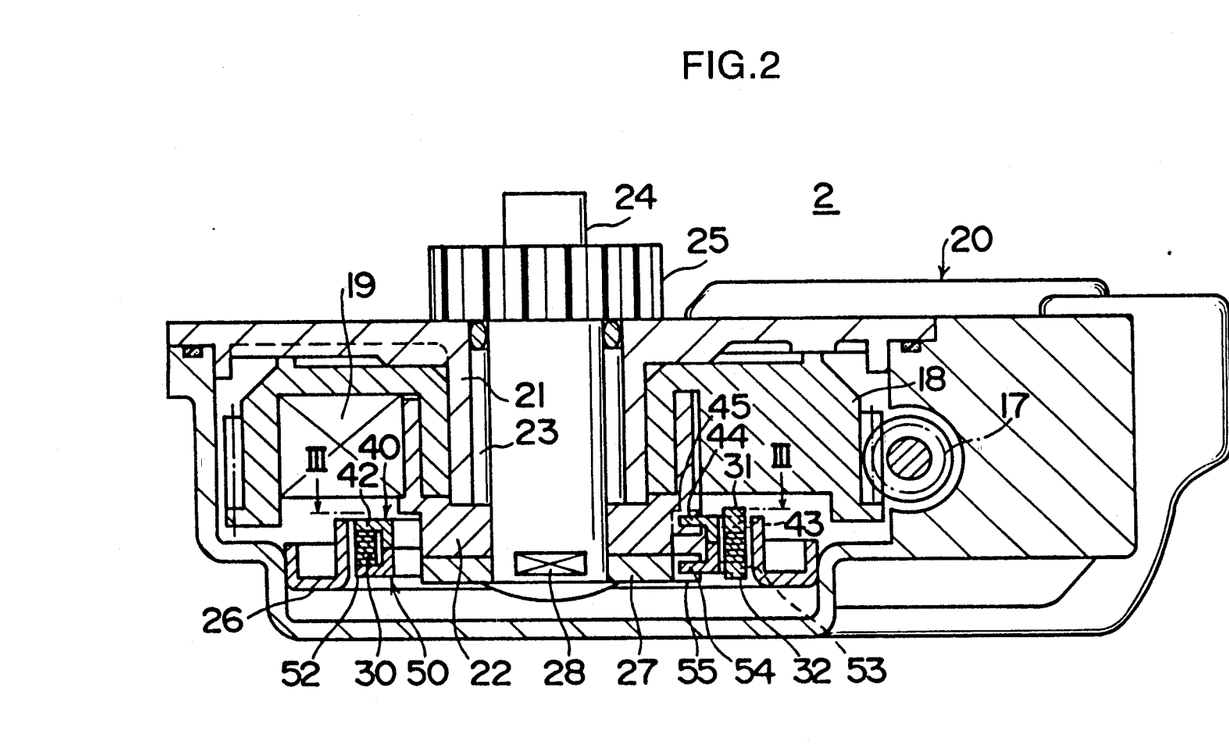
FIG. 2 is a front sectional view showing the reverse rotation preventing device.

On the other hand, as shown in FIG. 2, the reverse rotation preventing device 2 according to the present invention is provided with a housing 20 in which a worm wheel 18 is rotatably supported. Then, the worm 17 is inserted into this housing 20 to mesh with this worm wheel 18 which is connected to an input coupling 22 through a damper 19.

That is, in the housing 20, a bearing portion 21 is provided substantially at the center portion of the housing 20 and projected integrally therefrom, and the worm wheel 18 is rotatably supported on the external periphery of this bearing portion 21. The worm wheel 18 is integrally formed to provide a double cylindrical shape, and the input coupling 22 is provided coaxially with an internal cylindrical portion of the worm wheel 18 and rotatably coupled onto the external periphery of the internal cylindrical portion. The damper 19 is interposed between an external cylindrical portion of the worm wheel 18 and the input coupling 22, and this damper 19 is adapted to buffer and transmit a driving force between the worm wheel 18 and the input coupling 22.

Furthermore, an output shaft 24 is inserted through the internal periphery of the bearing portion 21 and rotatably supported by a bearing 23. One end of this output shaft 24 is projected outwardly from the housing 20. A pinion 25 is formed integrally with a projected end portion of the output shaft 24 and connected to a window opening-closing mechanism, not shown.

One end portion of the input coupling 22 in the axial direction thereof is projected outwardly from the internal side of the worm wheel 18, and a coil spring 30 to be described hereunder is provided coaxially with the input coupling 22 on the external periphery of the projected end portion. A fixed ring 26 is provided coaxially on the external periphery of the coil spring 30 in such a manner that the internal periphery of the fixed ring 26 is very close to the external periphery of the coil spring 30. The fixed ring 26 is integrally formed to provide a double cylindrical portion. The coil spring 30 is inserted through the internal cylindrical portion of the fixed ring 26, and the external periphery of the outer cylindrical portion of the fixed ring 26 is fixed to the internal peripheral surface of the housing 20.

On the other hand, an output coupling 27 is coaxially coupled to an end portion opposite to the pinion 25 of the output shaft 24, and this output coupling 27 is connected to the output shaft 24 so as to be integrally rotatable therewith by a joint portion 28 having two opposite flat sides. On the other hand, the output coupling 27 is timely connected to the input coupling 22 through the coil spring 30 and reinforcing rings to be described hereunder.

Figure 1:
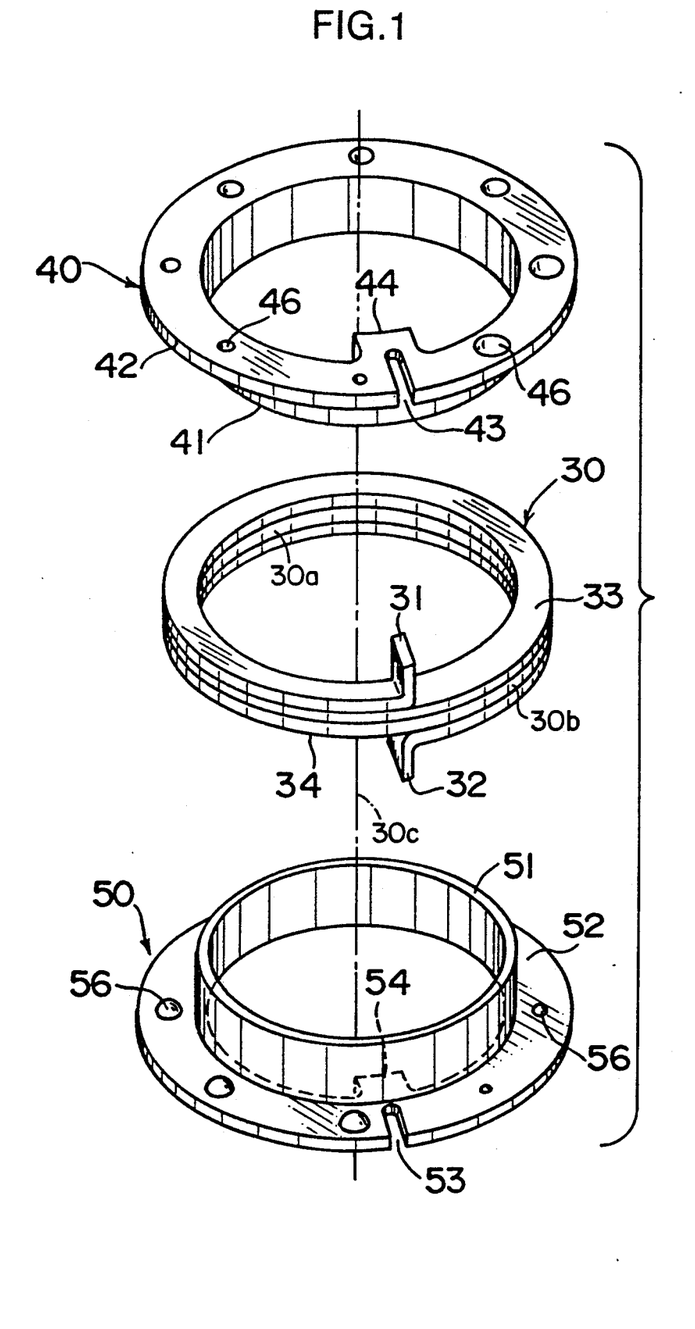
FIG. 1 is a disassembled perspective view showing a coil spring and the reinforcing rings used in an embodiment of the reverse rotation preventing device according to the present invention.

As shown in FIG. 1, the coil spring 30 is generally cylindrical in shape, with a central axis 30c and with an inner cylindrical periphery 30a and an outer cylindrical periphery 30b, and is formed by a number of windings of a spring material made of steel or the like, having a narrow-width plate shape. That is, the spring material is of generally rectangular cross section with the dimension of the spring material, as measured radially of said spring between its inner and outer peripheries 30a and 30b being significantly larger than its thickness as measured in the axial direction of the spring (along the central axis 30c). The coil spring 30 is wound such that the front and rear surfaces of the plate are arranged to face in the axial direction thereof. An engaging pawl 31 on the input side and an engaging pawl 32 on the output side are bent and projected respectively from a starting end of winding and a terminating end of winding of the coil spring, The both engaging pawls 31 and 32 are projectingly bent in the axial direction of the coil spring 30, i.e. upwardly and downwardly from the plate respectively and parallel to the central axis 30c.

Both end faces 33 and 34 in the axial direction (hereinafter referred to as "upward and downward directions") of the coil spring 30 are covered with a reinforcing ring 40 on the input side and a reinforcing ring 50 on the output side respectively, Each of the reinforcing rings 40 and 50 is integrally formed by a suitable working method such as the sintering method or the forging method, The reinforcing ring 40 on the input side includes a cylindrical portion 41 and a flange portion 42, The flange portion 42 is integrally projected so as to be perpendicular to the external periphery of one end of the cylindrical portion 41. Similarly, the reinforcing ring 50 on the output side includes a cylindrical portion 51 and a flange portion 52. The flange portion 52 is integrally projected so as to be perpendicular to the external periphery of one end of the cylindrical portion 51.

An engaging recession 43 for receiving the engaging pawl 31 on the input side of the coil spring 30 is cut inwardly in the radial direction at one position on the external peripheral portion of the flange 42 of the reinforcing ring 40 on the input side. An engageable pawl 44 to be engaged with an engageable portion 45 of the input coupling 22 is projected inwardly in the radial direction at the inside of this engaging recession 43. The outer diameter of the cylindrical portion 41 of the reinforcing ring 40 on the input side is substantially equal to the internal diameter of the coil spring 30, and this cylindrical portion 41 is adapted to be coupled into an upper half of the internal periphery of the coil spring 30.

On the other hand, an engaging recession 53 for receiving the engaging pawl 32 on the output side of the coil spring 30 is cut inwardly in the radial direction at one position on the external peripheral portion of the flange 52 of the reinforcing ring 50 on the output side. An engageable pawl 54 to be engaged with an engageable portion 55 of the output coupling 27 is projected inwardly in the radial direction at the inside of this engaging recession 53. The outer diameter of the cylindrical portion 51 of the reinforcing ring 50 on the output side is substantially equal to the internal diameter of the coil spring 30, and this cylindrical portion 51 is adapted to be coupled into a lower half of the internal periphery of the coil spring 30.

Figure 4A:
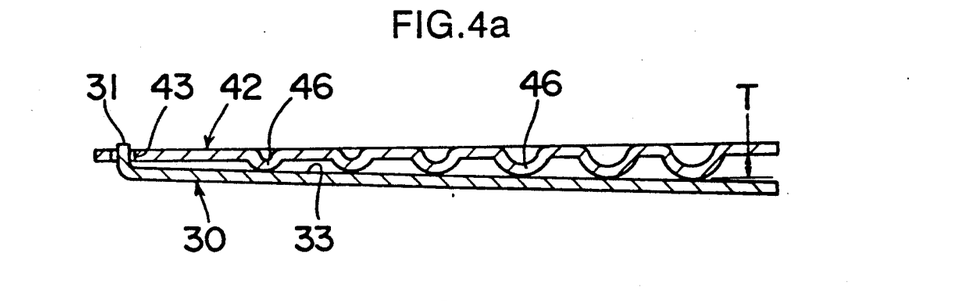
Figure 4B:
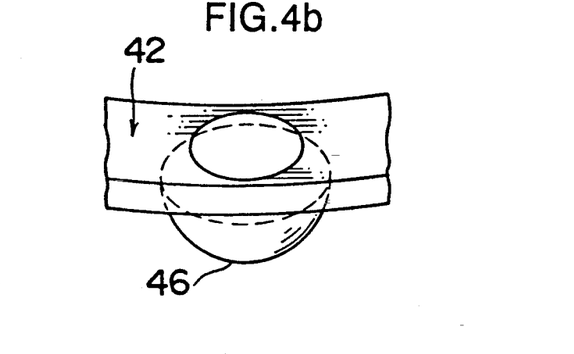
Figure 4C:
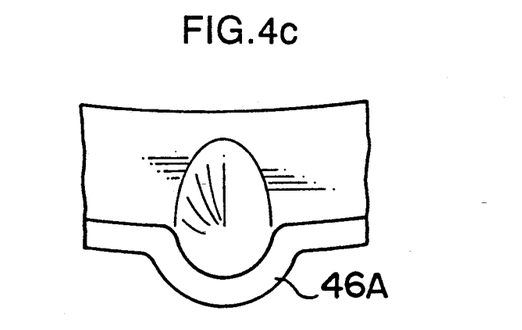

Further, as shown in FIGS. 4a, 4b and 4c a plurality of convexed semispherical projections 46 are formed expandingly to project inwardly (downwardly) in the axial direction and equidistantly in the circumferential direction at the internal surface (undersurface) in the axial direction of the flange portion of the reinforcing ring 40 on the input side. The respective projections are gradually decreased in height T in the circumferential direction, and an inclined surface obtained by the change in the height T corresponds to a surface of the coil spring 30 opposed thereto, i.e. an inclined surface of the top surface 33 of the coil spring 30, thereby absorbing the inclination of the opposed surface.

Although it is not shown in detail, similarly, a plurality of projections 56 are formed expandingly to project at the internal end surface (top surface) in the axial direction of the flange portion 52 so as to absorb the inclination of the undersurface 34 of the coil spring 30.

Action of this embodiment will hereunder be described. When the motor 10 is operated by a command for opening or closing the window of the vehicle, the turning force of the motor 10 is transmitted to the worm 17 through the output shaft 16 to rotate the worm wheel 18. Then, the turning force of the worm wheel 18 is transmitted to the input coupling 22 through the damper 19.

Figure 3:
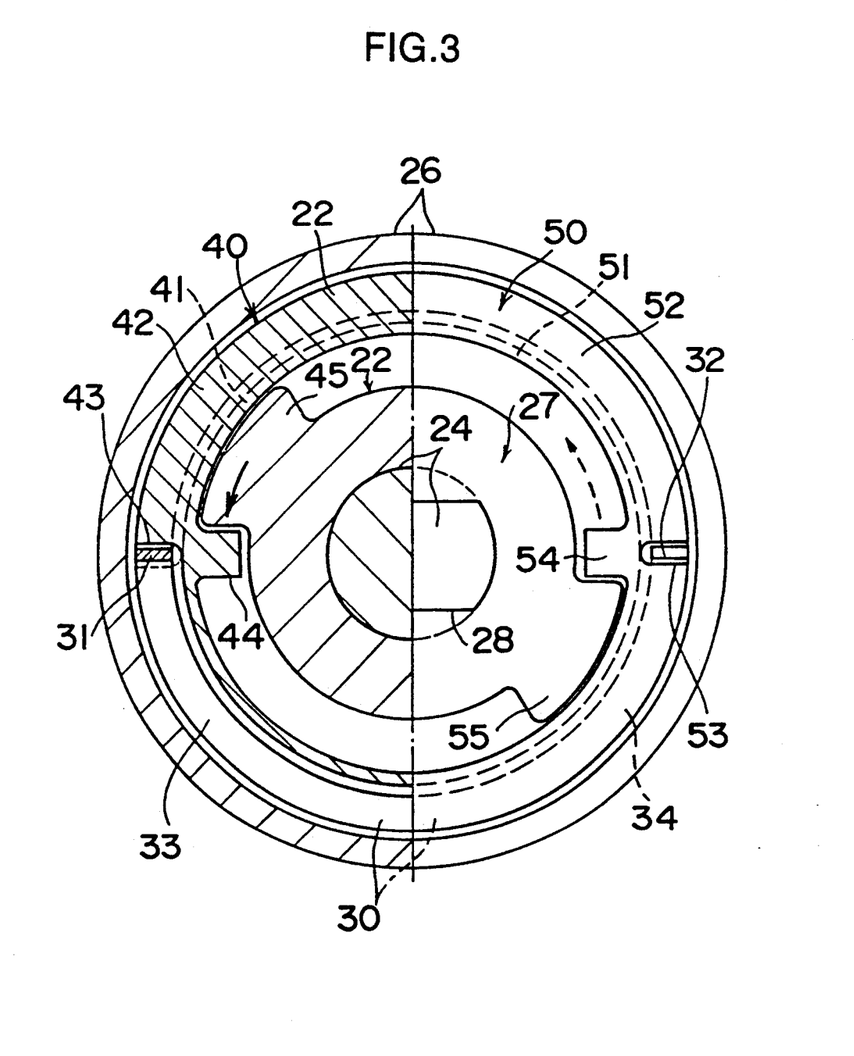
FIG. 3 is an enlarged partial sectional view taken along the line III—III in FIG. 2, FIGS. 4a, 4b and 4c show a reinforcing ring, FIG. 4a being an unfolded sectional view showing the relationship with the coil spring, FIG. 4b being an enlarged partial perspective view thereof, and FIG. 4c being an enlarged partial perspective view showing another embodiment of the reinforcing ring.

When the input coupling 22 is rotated, the engageable portion 45 thereof is engaged with the engageable pawl 44 of the reinforcing ring 40 on the input side as shown in the left region of FIG. 3, whereby the turning force from the input coupling 22 acts on the engaging pawl 31 on the input side of the coil spring 30 through the engaging recession 43. This force acts on the coil spring 30 in the direction of decreasing the diameter, whereby the external periphery of the coil spring 30 is separated from the fixed ring 26 and the input coupling 22 is rotated.

Then, along with the rotation of the input coupling 22, the turning force thereof is transmitted to the output coupling 27 through the coil spring 30, whereby the output coupling 27 is rotated and the output shaft 24 is rotated by the rotation of the output coupling 27. The turning force of the output shaft 24 is transmitted to a window opening-closing mechanism through the pinion 25 to thereby open or close the window.

Next, in the state where the window is closed, for example, when an external force is applied to forcedly open the window and this force for opening the window acts on the output shaft 24, the output shaft 24 rotates until the engageable portion 55 of the output coupling 27 comes into abutment with the engageable pawl 54 of the reinforcing ring 50 on the output side, whereby the reinforcing ring 50 on the output side is brought into the state of starting the rotation as shown in the right region of FIG. 3.

Thus, the turning force from the output shaft 24 acts on the engaging pawl 32 on the output side of the coil spring 30 through the reinforcing ring 50 on the output side. Then, this force acts on the coil spring 30 in the direction of increasing the diameter, whereby the external periphery of the coil spring 30 is pressed against the internal periphery of the fixed ring 26.

Due to this, the output coupling 27 and the input coupling 22 are prevented from rotating, whereby the turning force from the driven side can be prevented from rotating the output shaft 24 reversely.

Figure 5A:
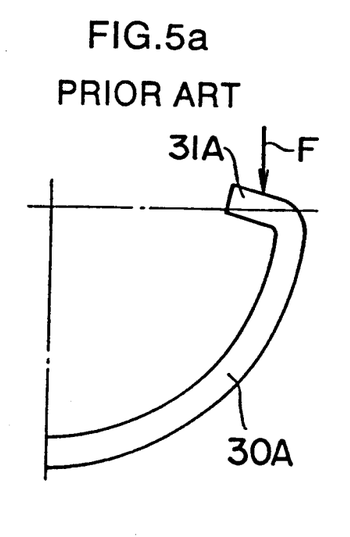
FIGS. 5a, 5b, 5c and 5d are explanatory views for explaining the actions of the coil spring.
Figure 5B:
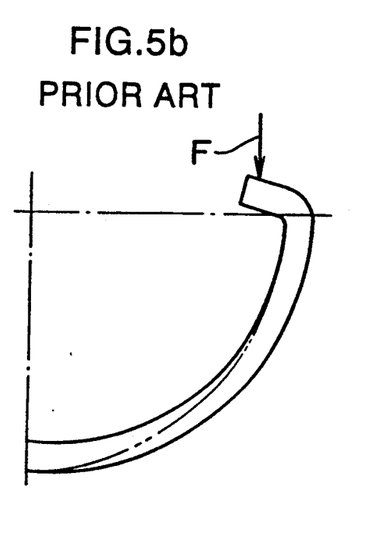

Now, in the case of the conventional example in which an engaging pawl 31A on the input side is bent inwardly in the radial direction and projected from a coil spring 30A as shown in FIG. 5a, the bending accuracy of the engaging pawl 31A on the input side tends to be low. Then, when the bending accuracy of the engaging pawl 31A on the input side is low, a driving force F may sometimes biasedly acts. When the driving force F biasedly acts as described above, such a state, for example, that the coil spring 30A is deformed in a manner to be distorted occurs as shown in FIG. 5b, so that the above-described diameter decreasing operation or diameter increasing operation of the coil spring 30A comes to be improper.

Figure 5C:
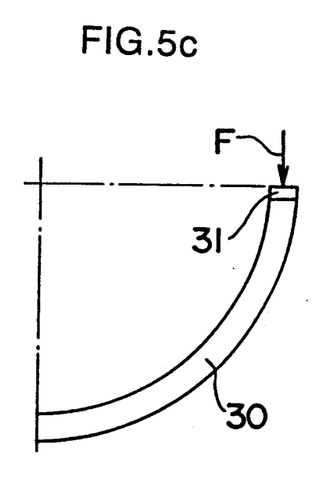
Figure 5D:
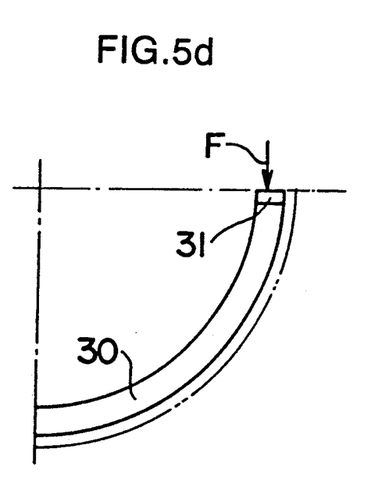

However, in this embodiment, the engaging pawl 31 on the input side provided on the coil spring 30 is bent in the axial direction, i.e. in the direction of the plate thickness as shown in FIG. 5c, whereby a high bending accuracy can be obtained (same can be said about the engaging pawl 32). Due to this, the driving force F properly and constantly acts on the engaging pawl 31 on the input side in the tangent direction, so that the state where the coil spring 30 is deformed to be distorted does not occur. As the result, the above-described diameter decreasing and diameter increasing operation by the coil spring 30 can be performed stably and properly at all times. Therefore, the above-described driving force transmitting operation and reverse rotation preventing operation by the coil spring 30 can be performed stably at any time.

Moreover, in this embodiment, the pluralities of projections 46 and 56 are expandingly formed on the contact surfaces of the reinforcing rings 40 on the input side and the reinforcing rings 50 on the output side to form the inclined surfaces, whereby the inclined surfaces on the both end surfaces 33 and 34 of the coil spring 30 are absorbed, respectively, so that the both reinforcing rings 40 and 50 are brought into the state of being closely contacted to the pawls of the coil spring 30 when the driving forces from the both reinforcing rings 40 and 50 act on the coil spring 30, respectively. As the result, the above-described driving force F constantly and properly acts on the engaging pawls 31 and 32 respectively on the input and output sides in the tangent line and horizontally, so that the coil spring 30 can be properly pushed by the respective reinforcing rings 40 and 50. Accordingly, the above-described driving force transmitting operation and reverse rotation preventing operation by the coil spring 30 can be performed more stably.

Incidentally, the present invention should not be limited to the above embodiments, and can be variously modified within the scope of the invention.

In the above embodiment, description has been given of the case where the projections 46 and 56 are expandingly formed in the semispherical shapes on the reinforcing ring 40 on the input side and the reinforcing ring 50 on the output side, however, it is possible to form projections 46A each having a one-fourth portion of an oval shape on the respective reinforcing rings as shown in FIG. 4c.

Furthermore, in the case where the reinforcing ring is manufactured by the sintering method, forging method and the like, the inclined surface of the reinforcing ring may be formed as a continuously inclined flat surface integrally with the reinforcing ring.

Further, the inclined surface of the reinforcing ring may be omitted.

As has been described hereinabove, according to the present invention, the engaging pawls are bently formed so as to project in the axial direction, respectively, at the starting end of winding and the terminating end of winding of the coil spring; the opposite ends of the coil spring in the axial direction are covered thereon by the reinforcing ring on the input side and the reinforcing ring on the output side, respectively; the engaging recessions of the both reinforcing rings are engaged with the both engaging pawls of the coil spring, respectively; and the engageable pawls to be engaged with the engageable portions of the input coupling and output coupling are formed on the internal peripheries of the both reinforcing rings; so that the coil spring can be reliably prevented from operating the diameter decreasing or the diameter increasing improperly.

What is claimed is:

1. A reverse rotation preventing device, comprising:
   a coil spring having a central axis and formed of a number of windings of spring material so as to have a generally cylindrical outer periphery and a generally cylindrical inner periphery and so as to have a starting end winding defining an input side of said spring providing a first end face and a terminating end winding defining an output side of said spring providing a second end face, said first and second end faces facing in opposite directions axially of said spring, said coil spring having a first engaging pawl at said starting end winding and a second engaging pawl at said terminating end winding;
   a fixed ring arranged coaxially with said coil spring and having an internal periphery disposed in proximity to and surrounding said outer periphery of said coil spring;
   an input coupling arranged coaxially with said coil spring and rotatable in a driving direction by a driving force from a driving source, said input coupling having an engageable portion;
   an output coupling arranged coaxially with said spring, supported rotatably and having an output shaft fixed thereto, said output coupling having an engageable portion;
   an output reinforcing ring on said input side of said spring covering said first end face of said spring in the direction axially thereof and having an internal periphery;
   an input reinforcing ring on said output side of said spring covering said second end face of said spring in the direction axially thereof and having an internal periphery;
   an engageable pawl formed on said internal periphery of said input reinforcing ring so as to extend radially inwardly from said internal periphery of said input reinforcing ring for engagement with said engageable portion of said input coupling;
   an engageable pawl formed on said internal periphery of said output reinforcing ring so as to extend radially inwardly from said internal periphery of said output reinforcing ring for engagement with said engageable portion of said output coupling;
   each of said first and second engaging pawls of said coil spring having been formed by bending a portion of the spring material of the respective one of said starting winding and terminating winding along a bend line extending radially of said spring so that said portion extends in the axial direction of said spring;
   said input reinforcing ring having an engaging recess for engaging the one of said engaging pawls on the starting winding of said coil spring, so as to operate said spring in the direction of decreasing spring diameter; and
   said output reinforcing ring having an engaging recess for engaging the one of said engaging pawls on the terminating winding of said coil spring, so as to operate said spring in the direction of increasing spring diameter.

2. The reverse rotation preventing device as set forth in claim 1, wherein each of said end faces of said spring has an inclination relative to a plane perpendicular to said central axis of said spring, and the surfaces of the respective reinforcing rings, which are opposed to the coil spring, are inclined surfaces each having an inclination relative to a plane perpendicular to said central axis of said spring corresponding to said inclination of the respective one of said end faces of said coil spring.

3. The reverse rotation preventing device as set forth in claim 2, wherein said inclined surface of each of said reinforcing rings is formed by a plurality of projections on said ring and different in height from one another.

4. The reverse rotation preventing device as set forth in claim 2, wherein said inclined surfaces of said input and output reinforcing rings have said coil spring interposed therebetween and are formed to be inverse to each other.

5. The reverse rotation preventing device as set forth in claim 1, wherein said first and second engaging pawls of said coil spring are bent in directions opposite to each other in the axial direction and are located at positions identical with each other in the circumferential direction of said spring.

6. The reverse rotation preventing device as set forth in claim 1, wherein each of said reinforcing rings has a cylindrical portion with two ends spaced from one another in the axial direction and a circumferential flange located at one of its said ends and extending radially outwardly from said cylindrical portion.

7. The reverse rotation preventing device as set forth in claim 6, wherein each of said flanges has a surface axially opposed to said coil spring.

8. The reverse rotation preventing device as set forth in claim 6, wherein the cylindrical portion of each of said reinforcing rings has an outer diameter substantially equal to the internal diameter of said coil spring.

9. The reverse rotation preventing device as set forth in claim 8, wherein said cylindrical portions of said reinforcing rings are received in and surrounding by said inner periphery of said coil spring.

10. The reverse rotation preventing device as set forth in claim 3, wherein said plurality of projections of each reinforcing ring are of convex semispherical shapes and are substantially equidistant from each other in the circumferential direction of the ring.

11. The reverse rotation preventing device as set forth in claim 10, wherein said projections of each ring are gradually decreased in height in the circumferential direction of the ring, so that said inclined surface of this ring obtained by the change in height corresponds to an adjacent end face of said coil spring.

12. The reverse rotation preventing device as set forth in claim 1, wherein said coil spring is comprised of a number of windings of spring material of generally rectangular cross section with the dimension of said spring material, as measured radially of said spring between said inner and outer peripheries of said spring being significantly larger than its thickness as measured in the axial direction of said spring.

* * * * *